United States Patent [19]
Tanaka et al.

[11] Patent Number: 5,379,054
[45] Date of Patent: Jan. 3, 1995

[54] POINTING DEVICE

[75] Inventors: Shinya Tanaka, Tokyo; Yoshiyuki Ito, Yokohama, both of Japan

[73] Assignee: ASCII Corporation, Japan

[21] Appl. No.: 233,892

[22] Filed: Apr. 25, 1994

Related U.S. Application Data

[63] Continuation of Ser. No. 138,805, Oct. 15, 1993, abandoned.

Foreign Application Priority Data

Oct. 19, 1992 [JP] Japan ............................ 4-072733[U]

[51] Int. Cl.$^6$ .............................................. G09G 3/02
[52] U.S. Cl. .................................. 345/163; 345/167; 74/471 X
[58] Field of Search ................. 345/163, 167; 74/471; 250/221; 273/85 R

[56] References Cited

U.S. PATENT DOCUMENTS 4,562,347 12/1985 Hovey et al. .................. 74/471 X
5,063,289 11/1991 Jasinski et al. ..................... 345/163

FOREIGN PATENT DOCUMENTS 3705492 8/1987 Germany .

Primary Examiner—Alvin E. Oberley
Assistant Examiner—Regina Liang
Attorney, Agent, or Firm—Pearne, Gordon, McCoy & Granger

[57] ABSTRACT

When keyboard 1 is set on the upper side, ball 10 is inserted between stopper 8 and the coordinate converting unit 4. As a result, the coordinate converting unit 4 is fixed by ball 10. When the user moves the pointing device on the flat surface, the ball 6 then moves according to the user's operation. Furthermore, when the user pushes keyboard 1, detecting switch 7 is pressed by protrusion 3, and then detecting switch 7 is switched to the ON state. On the other hand, when the pointing device is set upside down by the user, ball 10 moves to the opposite side via gravitation. The ball 10 is inserted between stopper 8 and keyboard 1 and, as a result, keyboard 1 is fixed by ball 10. When the user spins ball 6, the ball moves in all directions in accordance with the user's operation. Furthermore, when the user pushes coordinate converting unit 4, detecting switch 7 is pressed by protrusion 3, and then detecting switch 7 is switched to the ON state.

3 Claims, 2 Drawing Sheets

POINTING DEVICE

This is a continuation of application Ser. No. 08/138,805, filed Oct. 15, 1993, now abandoned.

BACKGROUND OF THE INVENTION

1. Field of the Invention

The present invention relates to a pointing device which is used as an input device for providing coordinate data of a CRT display of a computer.

2. Background Art

Conventionally, there are some kinds of pointing devices, such as a track ball, a mouse and so on, which are used as an input device to move the cursor around on a computer display. The track ball consists of a mounting which is usually in the form of a box, a ball which is set in the upper portion of the box, and one or more buttons. When the user spins the ball directly, the cursor moves at the speed and in the direction of the ball's motion. Furthermore the buttons are used for specific actions. On the other hand, the mouse consists of a box, a ball which is set thereunder, and one or more buttons. When the user moves the mouse on a flat surface, the ball rotates, and then the cursor moves at the speed and in the direction of the ball's motion. The buttons are also used for specific actions.

Recently, a pointing device having both functions of the track ball and mouse has been developed. In this pointing device, when the ball is set at the upper side thereof, it becomes a track ball. On the other hand, when the ball is set at the bottom side of the box, it becomes a mouse. However, in this pointing device, the function for switching from between the track ball to the mouse, and vice verse, is manually switched by the user.

SUMMARY OF THE INVENTION

Accordingly, it is an object of the present invention to provide a pointing device which can automatically control a function for switching from the track ball to the mouse and vice verse.

In order to achieve the above objective, the present invention provides a pointing device for inputting coordinate information of a CRT display of a computer, with said pointing device comprising:

- a keyboard means for inputting at least an on-off signal which is mounted at one side of the case of said pointing device so that it is capable of an up-and-down motion;
- a coordinate converting means for converting a movement of a ball, which is rotatably mounted thereabout, and a portion of the ball which is protruded from said coordinate converting means, where said coordinate converting means is mounted on the opposite side of the case of the pointing device so that it is capable of an up-and-down motion;
- a switching means for detecting an on-off operation of the user, where said switching means is mounted on a reverse side of said coordinate converting means;
- a protrusion means for pushing said switching means when user pushes either said keyboard means or said coordinate converting means, where said protrusion means is mounted on a reverse said of said keyboard means; and
- a rocking means for fixing either said keyboard means or said coordinate converting means, and, in addition, when said keyboard means is set at upper side, said rocking means is moved by gravitation toward said coordinate converting means to fix the up-and-down motion of said coordinate converting means whereas, on the other hand, when said coordinate converting means is set on the upper side, said rocking means is moved by gravitation toward said keyboard means to fix the up-and-down motion of said keyboard means.

BRIEF DESCRIPTION OF THE DRAWINGS

Further objects and advantages of the present invention will be apparent from the following description with reference to the accompanying drawings wherein a preferred embodiment of the present invention is clearly shown.

DESCRIPTION OF A PREFERRED EMBODIMENT

Figure 1A:
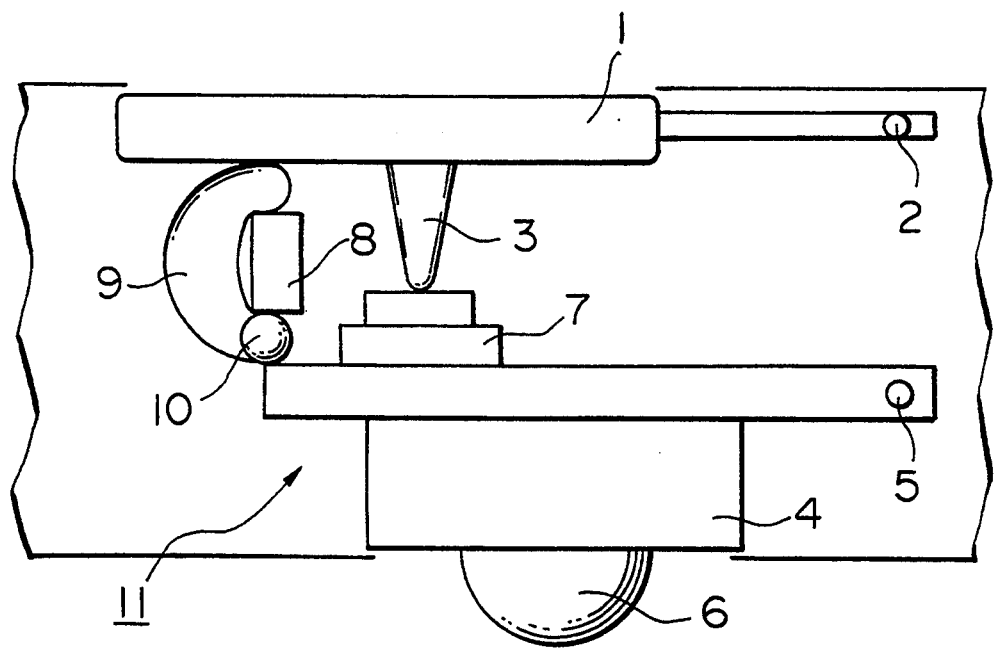
FIG. 1(A) is a sectional side elevation showing a construction of a pointing device according to a first embodiment of the present invention.

FIG. 1(A) is a sectional side elevation showing a construction of a pointing device according to a first embodiment of the present invention. In FIG. 1(A), a keyboard 1 consists of a plurality of keys on the upper side and a protrusion 3 on the bottom side. The keyboard 1 is rotatable and set around an axis 2. A coordinate converting unit 4 consists of a ball 6 which is rotatable in all directions around the center thereof. In addition, the coordinate converting unit 4 is rotatable and set around an axis 5. When the ball 6 rotates, the coordinate converting unit 4 supplies information relating to an amount of motion and a direction of motion according to the amount of motion of the ball 6 with respect to a computer (not shown). A detecting switch 7 is an on-off button switch, in which the detecting switch 7 is switched to the ON state when it is pressed by the protrusion 3. A stopper 8 is fixed on the box (not shown), and the ball 10 moves between the upper side and bottom side along a guide 9.

In the above condition, that is, when the keyboard 1 is set on the upper side, the ball 10 moves to the bottom side along the guide 9, and is inserted between the stopper 8 and the coordinate converting unit 4. Consequently, the coordinate converting unit 4 is fixed by ball 10. When the user moves the pointing device on the flat surface as shown in FIG. 1(A), then the ball 6 moves according to the user's operation. The coordinate converting unit 4 supplies the information such as the amount of motion and the direction of motion, according to the amount of motion of the ball 6 with respect to the computer. Furthermore, when the user pushes the keyboard 1, the detecting switch 7 is pressed by the protrusion 3, and then the detecting switch 7 is switched to the ON state.

Figure 1B:
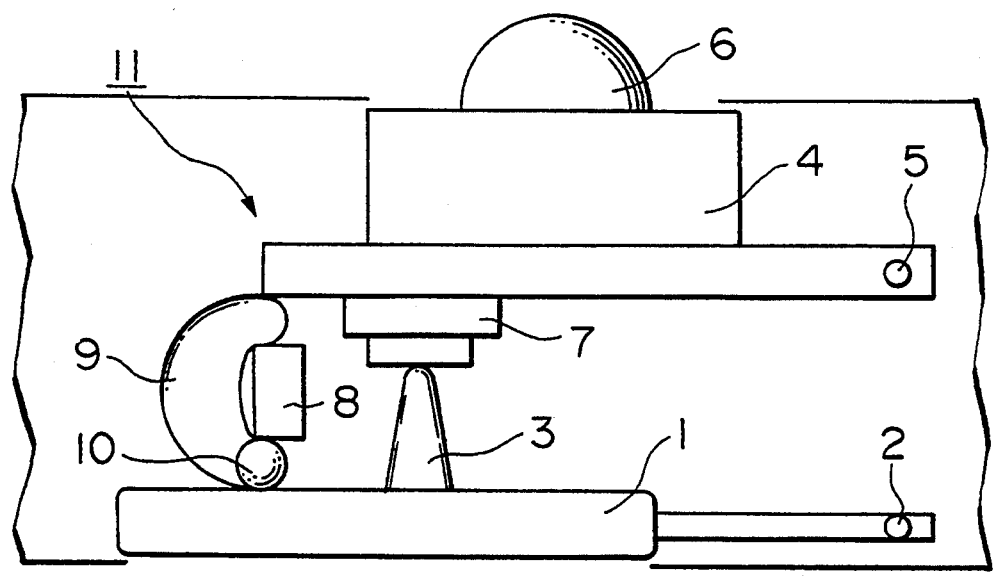
FIG. 1(B) is a sectional side elevation showing an upside-down view of a construction of the pointing device according to a first embodiment of the present invention.

FIG. 1(B) is a sectional side elevation showing an upside-down view of a construction of the pointing device according to a first embodiment of the present invention. In FIG. 1(B), when the pointing device is set upside down by the user, the ball 10 moves forward to the keyboard 1 by itself via gravity. The ball 10 is then inserted between the stopper 8 and the keyboard 1, and as a result, the keyboard 1 is fixed by the ball 10.

When the user spins the ball 6, the ball 6 moves in all directions in accordance with the user's operation. The coordinate converting unit 4 supplies the information such as the amount of motion and the direction of motion, according to the amount of motion of the ball 6 with respect to the computer. Furthermore, when the user pushes the coordinate converting unit 4, the detecting switch 7 is pressed by the protrusion 3, and then the detecting switch 7 is switched to the ON state.

Figure 2A:
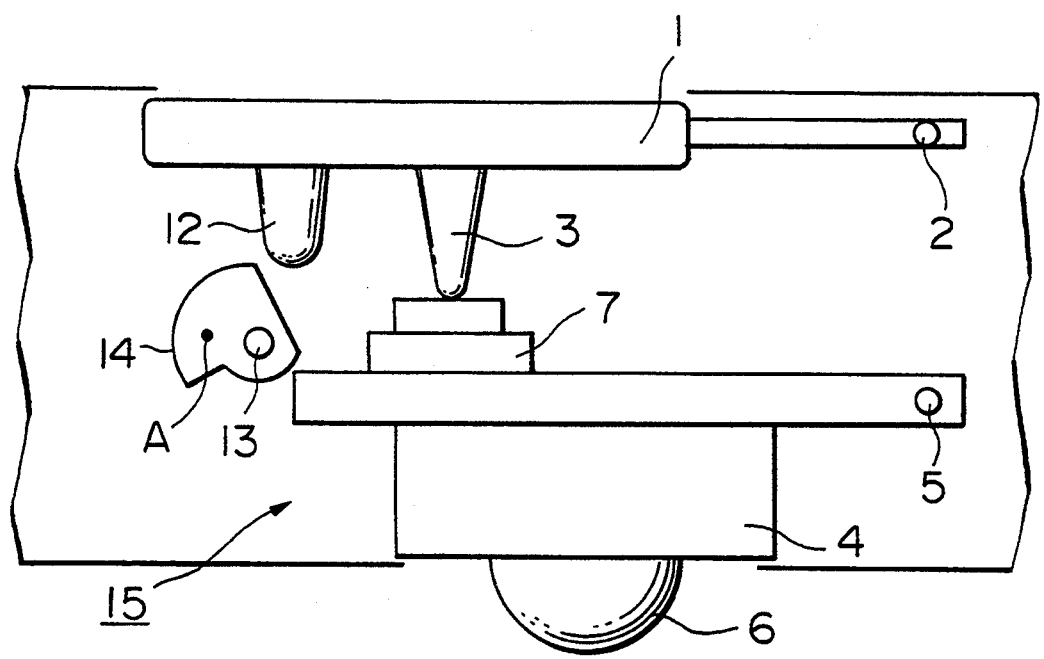
FIG. 2(A) is a sectional side elevation showing a construction of a pointing device according to a second embodiment of the present invention.

FIG. 2(A) is a sectional side elevation showing a construction of a pointing device according to a second embodiment of the present invention. An protrusion 12 is constructed under the keyboard 1, and is slightly shorter than the protrusion 3. A rotating portion 14 is rotatable and set around an axis 13 which is provided in the case of the pointing device. The rotating portion 14 has a center of gravity at point A, as shown in FIG. 2(A).

In the above condition, that is, in the case where keyboard 1 is set on the upper side, then the rotating portion 14 rotates around the axis 13, and is stopped at an edge of the base of the coordinate converting unit 4 as shown in FIG. 2(A). As a result, the coordinate converting unit 4 is fixed by the rotating portion 14.

When the user moves the pointing device on the flat surface, the ball 6 moves according to the user's operation. The coordinate converting unit 4 supplies the information such as the amount of motion and the direction of motion, according to the amount of motion of the ball 6 with respect to the computer. Furthermore, when the user pushes the keyboard 1, the detecting switch 7 is pressed by the protrusion 3, and then the detecting switch 7 is switched to the ON state.

Figure 2B:
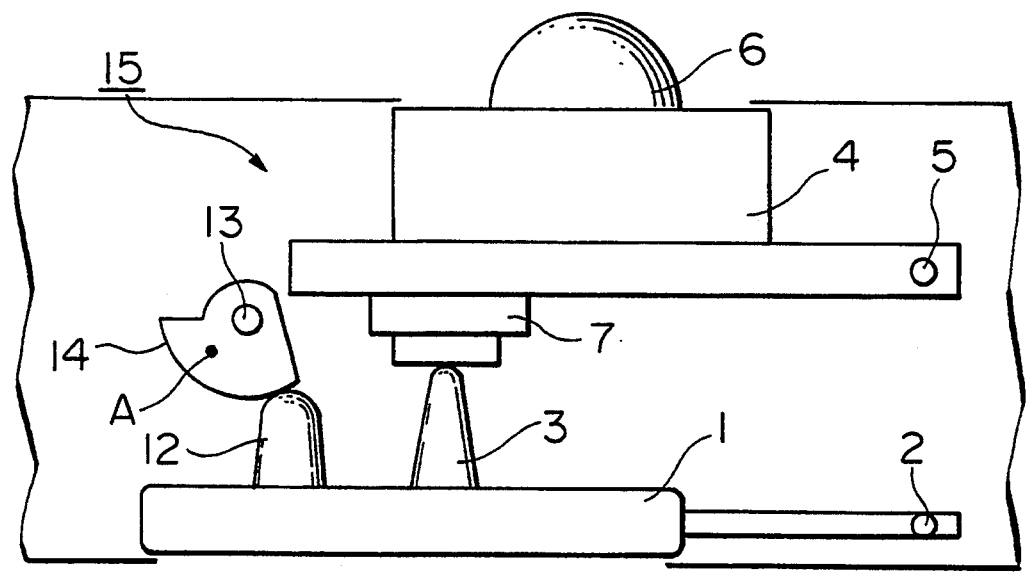
FIG. 2(B) is a sectional side elevation showing an upside-down view of a construction of the pointing device according to a second embodiment of the present invention.

FIG. 2(B) is a sectional side elevation showing an upside-down view of a construction of the pointing device according to a second embodiment of the present invention. When the pointing device is set upside down by the user, the rotating portion 14 is rotated around the axis 13 by itself via gravitation, and then the rotating portion 14 contacts and stops at the edge of the protrusion 12. As a result, the keyboard 1 is fixed by the rotating portion 14.

When the user spins the ball 6, the ball 6 moves in all directions in accordance with the user's operation. The coordinate converting unit 4 then supplies the information such as the amount of motion and the direction of motion, according to the amount of motion of the ball 6 with respect to the computer. Furthermore, when the user pushes the coordinate converting unit 4, the detecting switch 7 is pressed by the protrusion 3, and then the detecting switch 7 is switched to the ON state.

What is claimed is:

1. A pointing device for inputting coordinate information of a CRT display of a computer, with said pointing device comprising:

a keyboard means for inputting at least an on-off signal which is mounted at one side of the case of said pointing device so that it is capable of an up-and-down motion;

a coordinate converting means for converting a movement of a ball, which is rotatably mounted thereabout, and a portion of the ball which is protruded from said coordinate converting means, where said coordinate converting means is mounted on the opposite side of the case of the pointing device so that it is capable of an up-and-down motion;

a switching means for detecting an on-off operation of the user, where said switching means is mounted on a reverse side of said coordinate converting means;

a protrusion means for pushing said switching means when user pushes either said keyboard means or said coordinate converting means, where said protrusion means is mounted on a reverse said of said keyboard means; and a rocking means for fixing either said keyboard means or said coordinate converting means, and, in addition, when said keyboard means is set at upper side, said rocking means is moved by gravitation toward said coordinate converting means to fix the up-and-down motion of said coordinate converting means whereas, on the other hand, when said coordinate converting means is set on the upper side, said rocking means is moved by gravitation toward said keyboard means to fix the up-and-down motion of said keyboard means.

2. A pointing device for inputting coordinate information of a CRT display of a computer according to claim 1, where said pointing device is further comprising:

a stopper means which is constructed between said keyboard means and said coordinate converting means;

wherein said rocking means is a ball, which is provided so that it can move back and forth from the upper side to the bottom side, and vice verse, of said pointing device, along a guide;

wherein both distances between said stopper means and said keyboard means, and between said stopper means and said coordinate converting means, are equal to the diameter of said ball; and when said keyboard means is set on the upper side of said pointing device, said ball moves toward said coordinate converting means along said guide, and is inserted between said stopper means and said coordinate converting means, so that said coordinate converting means is fixed whereas, on the other hand, when said coordinate converting means is set on the upper side of said pointing device, said ball moves toward said keyboard means along said guide, and is inserted between said stopper means and said keyboard means so that said keyboard means is fixed.

3. A pointing device for inputting coordinate information of a CRT display of a computer according to claim 1, wherein said rocking means is an unsymmetrical plate with respect to a rotating axis thereof, and which has a center of gravity at an point of the unsymmetrical plate apart from the rotating axis, wherein said rocking means is provided so that it can rotate from the upper side to the bottom side, and vice verse, by itself via gravitation, of said pointing device; and when said keyboard means is set on the upper side of said pointing device, said unsymmetrical plate rotates toward said coordinate converting means by itself via gravitation, and contacts a bottom of said coordinate converting means, so that said coordinate converting means is fixed whereas, on the other hand, when said coordinate converting means is set on the upper side of said pointing device, said unsymmetrical plate rotates toward said keyboard means by itself via gravitation, and contacts a bottom of said keyboard means so that said keyboard means is fixed.

* * * * *

UNITED STATES PATENT AND TRADEMARK OFFICE
CERTIFICATE OF CORRECTION

PATENT NO. : 5,379,054
DATED : January 3, 1995
INVENTOR(S) : Tanaka, et. al.

It is certified that error appears in the above-indentified patent and that said Letters Patent is hereby corrected as shown below:

Title page, item [56], under "References Cited" (U.S. Patent Documents), insert --4,939,508  7/1990  Lawrence--.

Signed and Sealed this

Eighteenth Day of April, 1995

Attest:

BRUCE LEHMAN

*Attesting Officer*    *Commissioner of Patents and Trademarks*